United States Patent
Bailey et al.

(10) Patent No.: US 12,259,094 B2
(45) Date of Patent: Mar. 25, 2025

(54) PIPELINE FOLLOWING SENSOR ARRANGEMENT

(71) Applicant: The Charles Machine Works, Inc., Perry, OK (US)

(72) Inventors: Brian K. Bailey, Stillwater, OK (US); Kelvin P. Self, Stillwater, OK (US); Richard F. Sharp, Perry, OK (US); Scott B. Cole, Edmond, OK (US); Michael F. Gard, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 126 days.

(21) Appl. No.: 17/112,049

(22) Filed: Dec. 4, 2020

(65) Prior Publication Data
US 2021/0131615 A1  May 6, 2021

Related U.S. Application Data

(63) Continuation-in-part of application No. 16/738,447, filed on Jan. 9, 2020, now abandoned, which is a
(Continued)

(51) Int. Cl.
*F17D 5/06* (2006.01)
*B62D 1/28* (2006.01)
(Continued)

(52) U.S. Cl.
CPC .................. *F17D 5/06* (2013.01); *B62D 1/28* (2013.01); *B62D 6/001* (2013.01); *E02F 5/027* (2013.01);
(Continued)

(58) Field of Classification Search
CPC ... F17D 5/06; B62D 1/28; B62D 6/001; E02F 5/027; E02F 5/102; E02F 5/14;
(Continued)

(56) References Cited

U.S. PATENT DOCUMENTS 3,757,529 A  9/1973  Kaercher, Jr.
4,249,630 A  2/1981  Lougheed et al.
(Continued)

FOREIGN PATENT DOCUMENTS

CN    102472826 A  *  5/2012  ............... G01V 3/06

OTHER PUBLICATIONS

PRCI, "Cable-Based Leak Detection Retrofit Study", catalog, Nov. 4, 2015, 22 pages, Catalog No. PR-015-143715-R01, Southwest Research Institute, San Antonio, Texas.

*Primary Examiner* — Angelisa L. Hicks
(74) *Attorney, Agent, or Firm* — Tomlinson McKinstry, P.C.

(57) ABSTRACT

A method and apparatus for installing a monitoring cable or other utility near an existing pipeline. An electromagnetic signal may be induced on the pipeline, either directly, or by transmitting a signal from a vehicle carrying a sensor array. The sensors disposed on the vehicle communicate with a processor to determine a distance and orientation of the vehicle relative to the pipeline. The signal may be electromagnetic, acoustic, capacitive, or the like. A plow or other digging tool may be on the vehicle or a secondary vehicle. Such a digging tool opens a trench and installs the cable along a path disposed next to the pipeline within an acceptable distance range from the pipeline. The vehicle may be remotely or automatically operated.

15 Claims, 15 Drawing Sheets

Related U.S. Application Data continuation-in-part of application No. 16/158,245, filed on Oct. 11, 2018, now abandoned, which is a continuation of application No. 15/962,517, filed on Apr. 25, 2018, now abandoned.

(60) Provisional application No. 62/943,579, filed on Dec. 4, 2019, provisional application No. 62/792,234, filed on Jan. 14, 2019, provisional application No. 62/489,815, filed on Apr. 25, 2017.

(51) Int. Cl.
| | | |
|---|---|---|
| *B62D 6/00* | (2006.01) | |
| *E02F 5/02* | (2006.01) | |
| *E02F 5/06* | (2006.01) | |
| *E02F 5/10* | (2006.01) | |
| *E02F 5/14* | (2006.01) | |
| *E02F 9/20* | (2006.01) | |
| *E02F 9/24* | (2006.01) | |
| *E02F 9/26* | (2006.01) | |
| *G01M 3/40* | (2006.01) | |
| *G05D 1/00* | (2024.01) | |

(52) U.S. Cl.
CPC ............. *E02F 5/102* (2013.01); *E02F 5/14* (2013.01); *E02F 5/145* (2013.01); *E02F 9/205* (2013.01); *E02F 9/245* (2013.01); *E02F 9/265* (2013.01); *G01M 3/40* (2013.01); *G05D 1/0212* (2013.01); *G05D 1/0259* (2013.01); *G05D 1/0265* (2013.01); *E02F 5/06* (2013.01); *E02F 5/103* (2013.01)

(58) Field of Classification Search
CPC . E02F 5/145; E02F 9/205; E02F 9/245; E02F 9/265; E02F 5/06; E02F 5/103; G01M 3/40; G05D 1/0212; G05D 1/0259; G05D 1/0265; G05D 2201/0202
See application file for complete search history.

(56) References Cited

U.S. PATENT DOCUMENTS

| | | | | |
|---|---|---|---|---|
| 4,982,359 | A | * | 1/1991 | Kamiyama ............ G01C 21/26 73/178 R |
| 5,585,726 | A | | 12/1996 | Chau |
| 5,917,325 | A | * | 6/1999 | Smith ..................... G01V 3/081 175/45 |
| 6,411,094 | B1 | | 6/2002 | Gard et al. |
| 6,633,163 | B2 | | 10/2003 | Fling |
| 6,667,709 | B1 | | 12/2003 | Hansen et al. |
| 6,825,775 | B2 | * | 11/2004 | Fling ................. H04L 25/03006 324/326 |
| 7,038,454 | B2 | | 5/2006 | Gard et al. |
| 7,759,824 | B2 | | 7/2010 | Gard et al. |
| 10,976,285 | B2 | | 4/2021 | Freear et al. |
| 2016/0147225 | A1 | | 5/2016 | Sights et al. |

* cited by examiner

PIPELINE FOLLOWING SENSOR ARRANGEMENT

FIELD

The present invention relates generally to an apparatus and method for installing a monitoring cable proximate an in-situ pipeline.

SUMMARY

The present invention is directed to an apparatus for installing a line along a length of buried pipeline. The apparatus comprises a machine frame, a plow, a first proximity sensor, and a second proximity sensor. The machine frame comprises at least one ground engaging drive member, and defines a first and second end and longitudinal centerline. The plow is disposed on the second end of the frame. The first and second proximity sensors are longitudinally spaced and both capable of detecting an electromagnetic field emanating from the buried pipeline.

The present invention is further directed to a method. The method comprises inducing an electromagnetic signal on a length of buried pipeline and translating a mobile machine along the length of the buried pipeline. The magnetic signal is detected at the mobile machine frame as it translates along the length of pipeline. The signal is used to maintain the machine frame along a path a desired distance range away from the buried pipeline. The method further comprises opening a trench along the path as the machine frame is translated along the length of the pipeline and installing a line within the trench.

The invention is further directed to a system comprising a pipeline, a monitoring line, and a processor. The monitoring line is disposed at a distance of less than ten feet from the pipeline and carries a signal along its length. The processor is in communication with the monitoring line and detects interruptions or abnormalities in the signal. The monitoring line and pipeline are at least partially underground. At the onset of the second residence time, the pipeline contains a flowing material.

DETAILED DESCRIPTION

Figure 1:
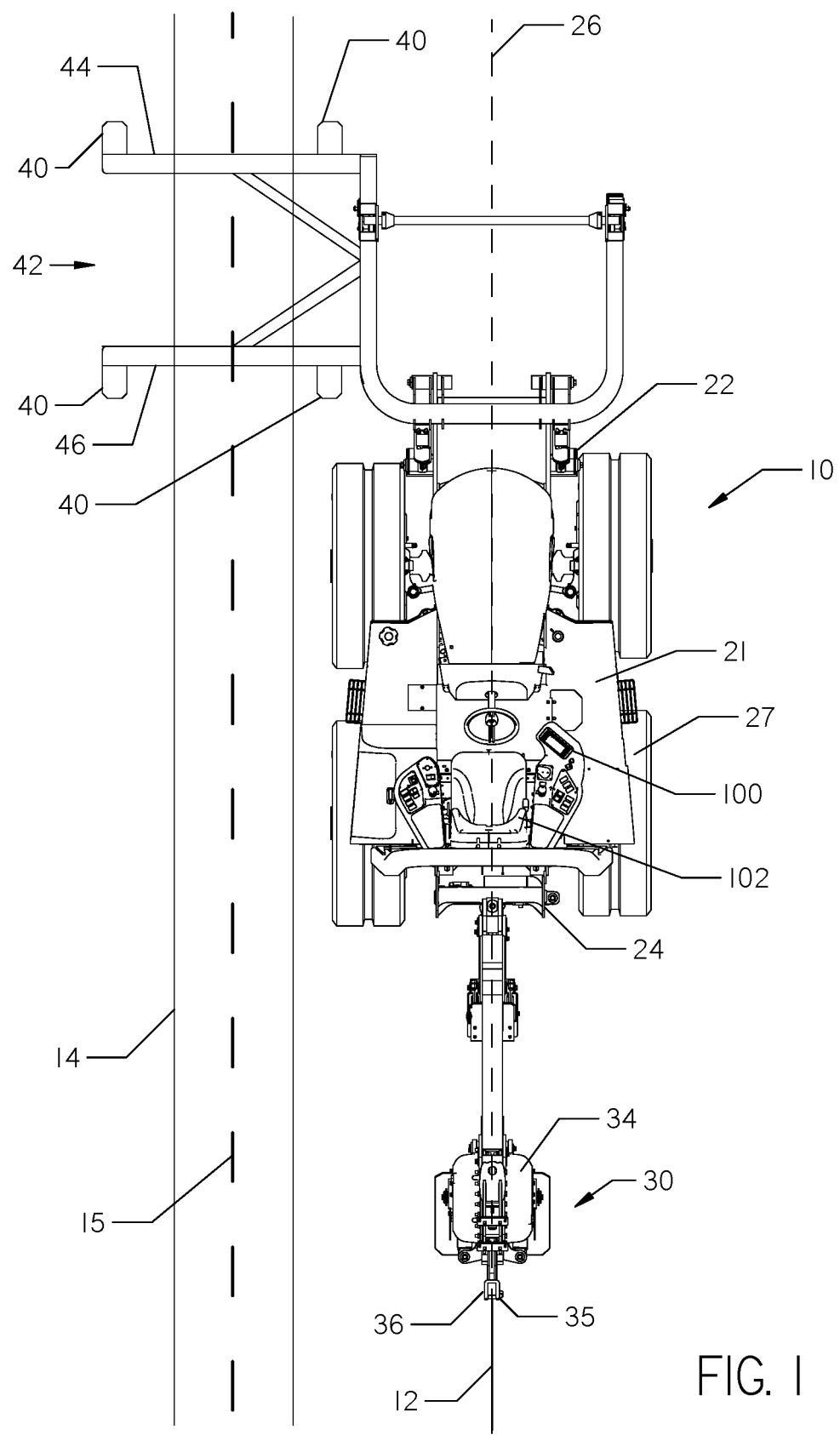
FIG. 1 is a top view of a cable installation machine disposed near a footprint of a buried pipeline.

Pipelines transmit a flowing material, such as water, crude oil or natural gas, from one location to a distant location. Such pipelines must be monitored to detect leaks, nearby digging activity, and the like. Pressurized liquid or gas may rapidly expand from any breach of the pipeline. Leaks could cause environmental damage and loss of valuable product, and could lead to safety hazards. Any digging activity that does not take particular care to avoid the pipe risks causing the same hazards.

In recent years, monitoring systems have been developed to remotely monitor a condition of the pipeline, which may include leaks and nearby digging. For example, fiber optic cable or other sensor lines, laid along the length of a pipeline, carry a signal between spaced nodes. When the signal is interrupted or distorted, software interprets that disruption to determine the nature and location of a hazard. Such real-time monitoring can allow quick mitigation of the hazard.

While new installations of pipelines allow for easy installation of such monitoring lines during the installation process, many thousands of miles of such pipelines exist without monitors. The present invention provides a way to install monitors, such as fiber-optic monitoring lines, next to pre-existing pipelines.

Much of the difficulty in such installation is due to the nature of oil and gas pipelines. Pipelines are typically installed with 3 to 6 feet of groundcover. Oil pipelines range in diameter from 6 to 48 inches. Gas pipelines range in diameter from 16 to 48 inches, and may be at 200 to 1500 psi. While maps of active lines typically exist, vital data, such as the diameter of the pipe, its exact position, exact depth, lateral junctions, y- and t-joints left for expansion, location of curves, etc., may not be included. Additionally, what data there is may be rendered unreliable by uncertainty, soil erosion, or migration of the pipe due to the passage of time.

Thus, whether a pipeline has been installed 6 months, 10 years, or half a century prior to an installation, any installation of a monitoring line next to a pipeline is problematic for several reasons.

Additionally, to be effective, fiber lines should be installed from approximately 18 inches to 3 feet away from the pipeline. Urban and suburban utility easements may limit the maximum separation possible. For gas lines, the preferred installation position for leak detection may be at 10 o'clock or 2 o'clock relative to the pipeline. For oil lines, the preferred position may be at 5 o'clock or 7 o'clock. The optimal position for detecting digging may be directly above the pipeline. In each of these cases, a monitoring line will be less effective with distance from the pipeline.

Fiber lines and similar monitoring lines may be installed by conventional vibratory plows, trenchers, horizontal directional drills and other methods. However, as detailed above, the underground pipe's location is unpredictable and an inadvertent strike of the line could be catastrophic.

A charge or electromagnetic signal may be induced on the oil or natural gas pipeline, as many of these pipelines are made of a conductive material, like steel. When made of non-conductive material such as plastic, a tracer wire is buried alongside the pipeline to facilitate pipeline location by inducing a charge or signal on the wire. A signal transmitter may be attached to such tracer wire or conductive pipelines to impress or induce a signal along its length. Such active locating causes a pipe to be "illuminated" such that locating devices can detect the signal as it emanates from the pipe.

Due to the relatively large diameters of some oil and gas pipelines, and the relatively close distance at which a monitoring line needs to be installed, an "illuminated" pipe may appear less like a filament and more like a surface to locating device. Additionally, tees, elbows, pipe taps and other anomalies may render the pipe non-cylindrical in stretches. Thus, error will be associated with an estimated centerline or an estimated outside edge of a detected pipe. The system disclosed herein accounts for such error when installing a monitoring line near a previously installed pipeline.

Figure 2A:
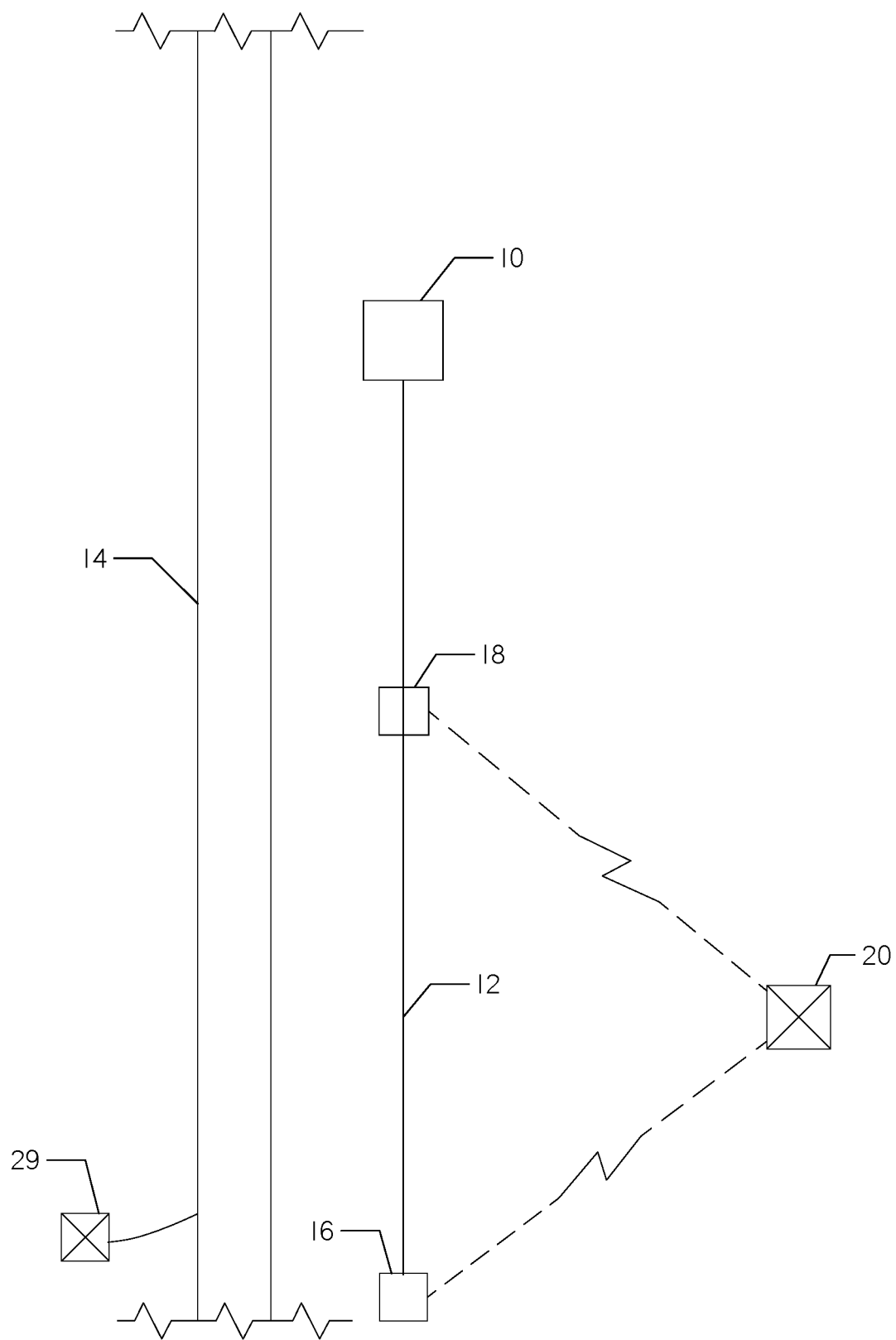
FIG. 2A is a diagrammatic representation of a top view of a system for monitoring a pipeline.
Figure 2B:
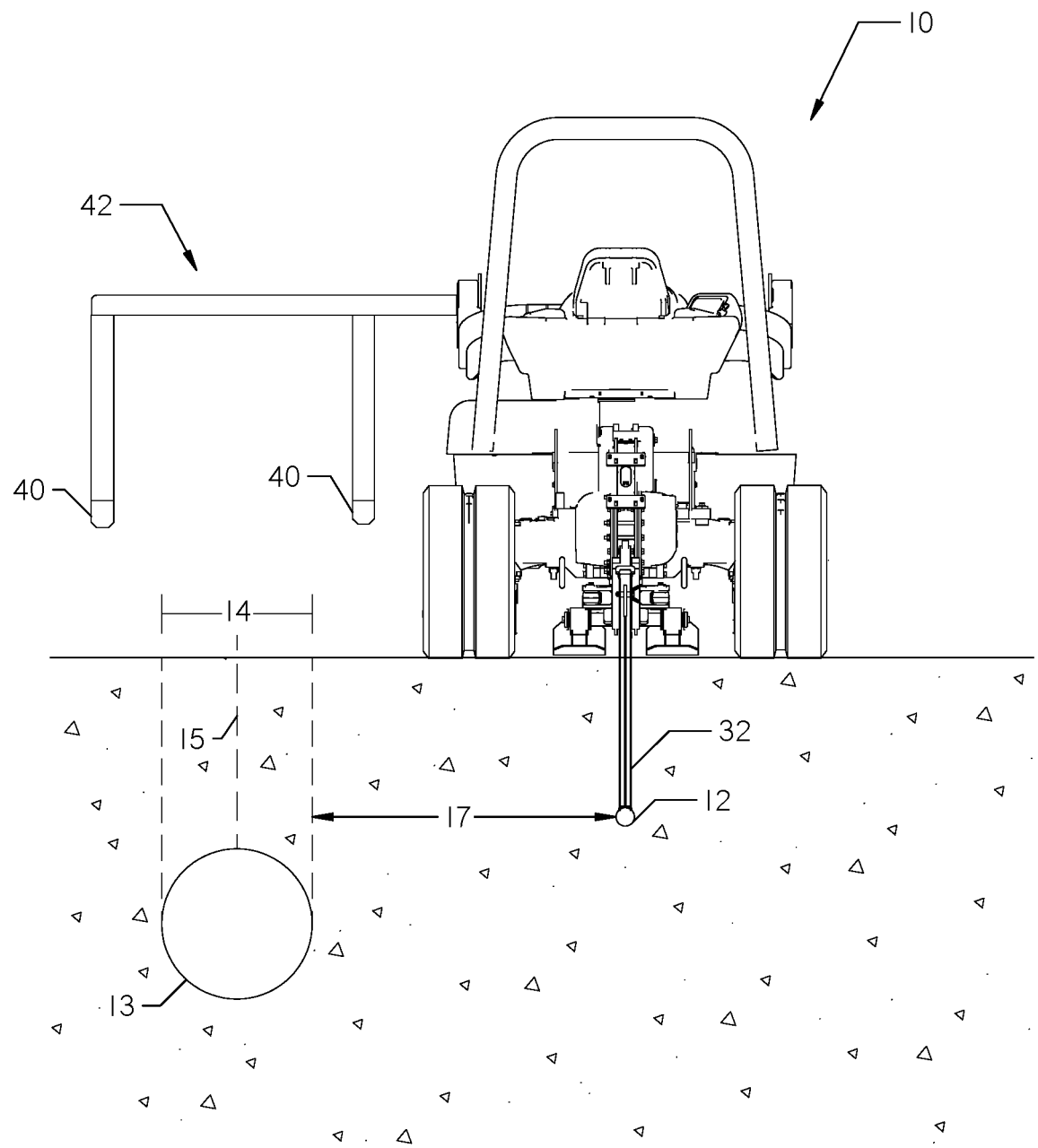
FIG. 2B is a diagrammatic representation of a side view of the system of FIG. 2A.

With reference to FIG. 1, an apparatus for installing a line substantially parallel to an existing pipeline is shown. An installation machine 10 is shown installing a monitoring cable 12 proximate a buried pipeline 13 (FIG. 2B). A footprint 14 of the buried pipeline 13 is projected on a surface of the ground. A centerline 15 of the buried pipeline 13 is likewise shown projected on a surface of the ground. It should be understood that the pipeline may be installed 3 to 6 feet beneath the footprint 14.

The monitoring cable 12 may be of a type known in the industry to detect external hazards, leaks, or internal degradation of the pipeline. Such cables are typically fiber optic, though some cables may include specialized sensing cables or sensors which sense a physical change in pipeline operation. This physical change could be a leak, change in temperature, vibration or other physical phenomenon. In operation of the system, as shown in FIG. 2A, signals are sent along the monitoring cable 12 from a first node 16 to a distant second node 18. Typically, such a signal is a series of light pulses, though it could include electrical signals or other methods of communicating a change in physical state. It should be understood that a great many nodes may cooperate along a length of monitoring cable. Each node 16, 18 may be up to a kilometer or more apart. Alternatively, said cable could be comprised of specialized sensors which detect one or more characteristics of improper pipeline operation spaced all along the cable.

The second node 18 sends data indicative of the received signal to a monitoring processor 20. The monitoring processor 20 analyzes the received signal for a change in pipeline operation indicating an interruption or distortion. Such an interruption or distortion will determine the location and nature of a hazard. Remedial or preventive measures may be taken at the precise location of the hazard.

As shown in FIG. 2B, the pipeline 13 is disposed with the monitoring cable 12 at approximately the 2 o'clock position. The cable 12 is a distance 17 away from the edge of pipeline 13. This distance 17 should be within a range between a maintained minimum gap and maximum distance. The maximum distance between the pipeline 13 and monitoring cable 12 to allow the cable 12 to be effective may be between 1.5 and 3 feet. Other lengths, such as 6 to 10 feet, may also be feasible. Likewise, for new monitoring cable installations, a minimum gap to minimize the risk of a strike between installation devices and the pipeline 13 may be between 12 and 24 inches.

In prior art systems, the monitoring cable 12 and pipeline would need to be installed at the same time. This is due to difficulties in installing a monitoring cable 12 underground near the footprint 14 of a previously buried pipeline. However, due to the installation machine 10, a monitoring cable 12 may be installed in proximity to a pipeline with a residence time of more than six months to a year. In some instances, pipelines will have been in place for decades prior to installation of the monitoring cable 12.

With reference again to FIG. 1, the installation machine 10 comprises a frame 21. The frame 21 has a front end 22, a rear end 24, and a longitudinal axis 26 disposed along its centerline. The machine frame 21 is translated across a surface of the ground by one or more ground drive members 27. As shown, the installation machine 10 comprises four tracks.

The installation machine 10 comprises a plow assembly 30 disposed at the rear end 24 along the longitudinal axis. The plow assembly 30 comprises a plow blade 32 (FIGS. 3A-3C), a vibrator assembly 34, and a cable guide 35. The vibrator assembly 34 imparts a vibration to the plow blade 32 to open a trench for placement of the monitoring cable 12. The cable guide 35 provides a channel 36 for feeding the monitoring cable 12 into the trench.

The installation machine 10 further comprises at least one sensor 40 disposed on the frame. Preferably, the installation machine 10 comprises a plurality of sensors. The plurality of sensors 40 may be spaced longitudinally relative to the frame 21. The sensors 40 may alternatively, or in addition, be spaced laterally about the frame 21 or vertically relative to the surface of the ground.

In any case, sensors 40 are operatively connected to a processor 100. The processor 100 analyzes signals received by the sensors 40 as will be further described below, and uses those signals to determine the distance and orientation of the pipeline relative to the plow, and display or make operational or steering adjustments in response. The processor 100 may be included onboard the machine 10 as shown in FIG. 1, or may be remote. The processor 100 may control the machine 10 directly, or may provide information to an operator at an operator station 102 located on the machine frame 21 or a remotely located operator at a distant point removed from the machine.

The sensors 40 may be magnetometers, magnetoresistive devices, triaxial ferrite rods, triaxial air core antennas, or similar sensing devices in controlled geometries. A single point electromagnetic field decomposition may be used to determine the relative orientation of the pipeline from the sensor 40, but not necessarily separation distance. Using two or more spaced-apart sensors 40 may allow distance to be estimated and may provide steering input as the sensors 40 detect a change in the course of the footprint 14. The processor 100 may then instruct the machine 10 to maintain a relatively constant distance from the footprint. Alternatively, distance may be displayed to a machine operator, who steers the tractor to maintain the desired distance. Alternatively, steering the plow assembly 30 relative to the tractor 10 may be used in conjunction with steering by the processor 100. The sensors 40 may be calibrated to a representative pipe segment to improve distance estimates obtained from the processor 100.

In one embodiment, shown in FIGS. 1, 2B, 4, 5, and 7, an array of sensors 40 are disposed on a sensor outrigger 42. The outrigger 42 is preferably positioned near the front of tractor 10 to provide distance input to processor 100. Outrigger 42 may be separated from the frame 21 to decrease the influence of the frame's steel on the sensors 40. The sensor outrigger 42 comprises a first arm 44 and a longitudinally spaced second arm 46.

As shown, two sensors 40 are laterally spaced on the first arm 44 and two sensors are laterally spaced on the second arm 46. The arms 44, 46 of the sensor outrigger 42 may telescope to adjust the distance between sensors 40. This will be advantageous when changing the offset distance between tractor 10 and the pipe centerline 15. The outrigger 42 may alternatively comprise only one arm 44, as shown in FIG. 4. In FIG. 4, the sensors 40 of the outrigger 42 are used in conjunction with a proximity sensor 54 disposed near the plow assembly 30. Such configuration is shown in more detail in FIG. 3A.

Figure 5:
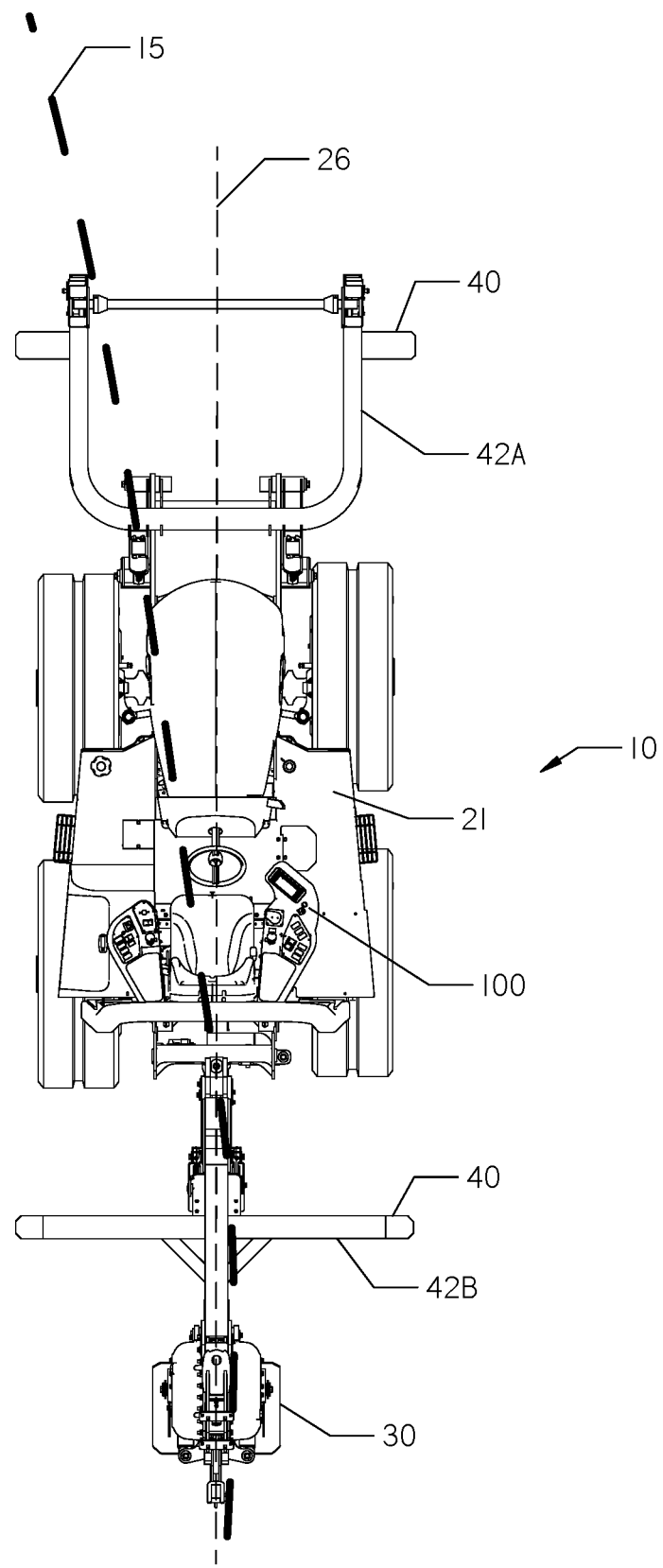
FIG. 5 is an alternative cable installation machine having front and rear sensor arrays disposed about the longitudinal axis of the machine.

The outrigger 42 may be placed in line with the longitudinal axis 26 of the machine 10, as shown in FIG. 5. A front 42A and rear 42B outrigger are in line with the longitudinal axis 26 and the centerline 15. Such a configuration may be advantageous for positioning the monitoring line 12 directly above the pipeline 13. As shown in FIG. 5, the pipeline 13, as represented by centerline 15, is turning to the left, necessitating a steering adjustment by the processor 100.

In FIG. 1, the outrigger 42 is cantilevered relative to the machine 10 such that sensors 40 are disposed away from the machine frame 21 on a single side of the longitudinal axis 26 and on each side of the footprint 14. If the pipeline is magnetic or contains a conductive tracer wire, a locating signal may be placed on the pipeline by a transmitter 29 (FIG. 2A). Locating transmitters may produce locating steady-state signals at a plurality of possible frequencies. Thus, the sensors 40 should be capable of detecting the signal at more than one frequency. As used herein, "steady-state" should be understood to mean a consistent signal, though such a steady-state signal may vary in predetermined or predictable ways to aid in identification. Such methods may include by changing magnitudes, pulsing the signal on and off, and varying the frequency.

The sensors 40 disposed on opposite sides of the centerline 15 of footprint 14 may coordinate to indicate equivalent but opposite or balanced readings. Such a result indicates that the footprint 14 is centered between opposing sensors 40. The installation machine 10 may be steered as changes in the field are detected by the sensors 40 to maintain this "null" or balanced sensor 40 reading. By centering the footprint 14 and pipeline between a pair of sensors 40, a minimum distance between the pipeline and the plow blade 32 may be maintained. Alternatively, sensors 40 may be offset from the centerline 15 and still measure the relative position of the centerline 15.

While an outrigger 42 may be used with the installation machine 10, a separate vehicle 101 (FIG. 10) could contain the sensors described above. The separate vehicle 101 could either operate simultaneously with the installation vehicle 10, or could create a record of the footprint 14 for later use by the installation vehicle. This record may be a physical marker, such as a paint line, or a virtual marker, such as GPS coordinates, virtual paint markers, or the like. The separate vehicle could communicate with the installation machine 10 via Bluetooth or similar communication methods to establish a preferred orientation when a monitoring cable 12 is being simultaneously installed. One such vehicle is shown in Provisional Application No. 62/943,579, from which this application claims priority, and which is incorporated by reference herein. The image at FIG. 1 thereof is appended hereto at Appendix A.

Figure 9:
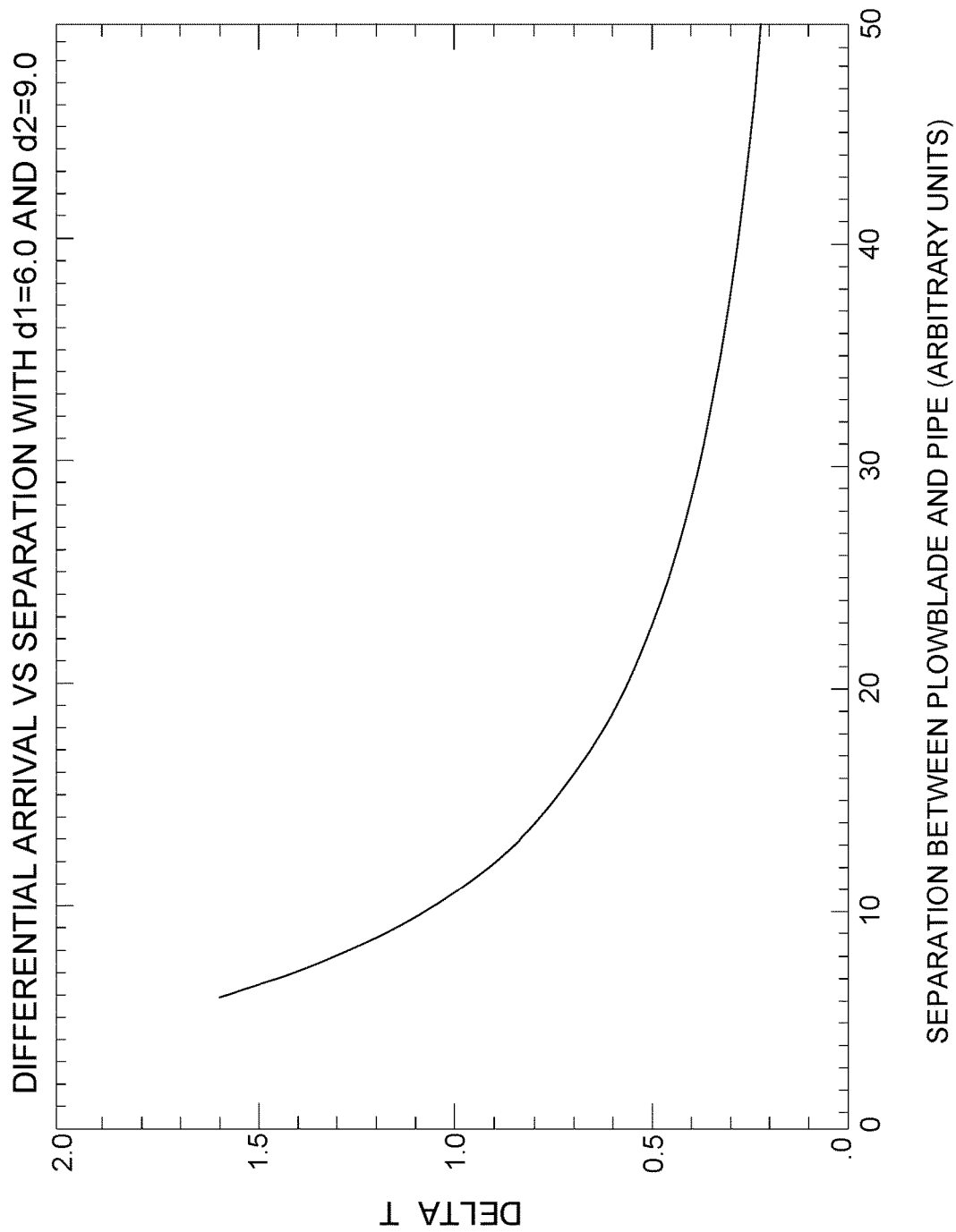
FIG. 9 is a graphical representation of plow blade separation vs. signal arrival time.
Figure 10:
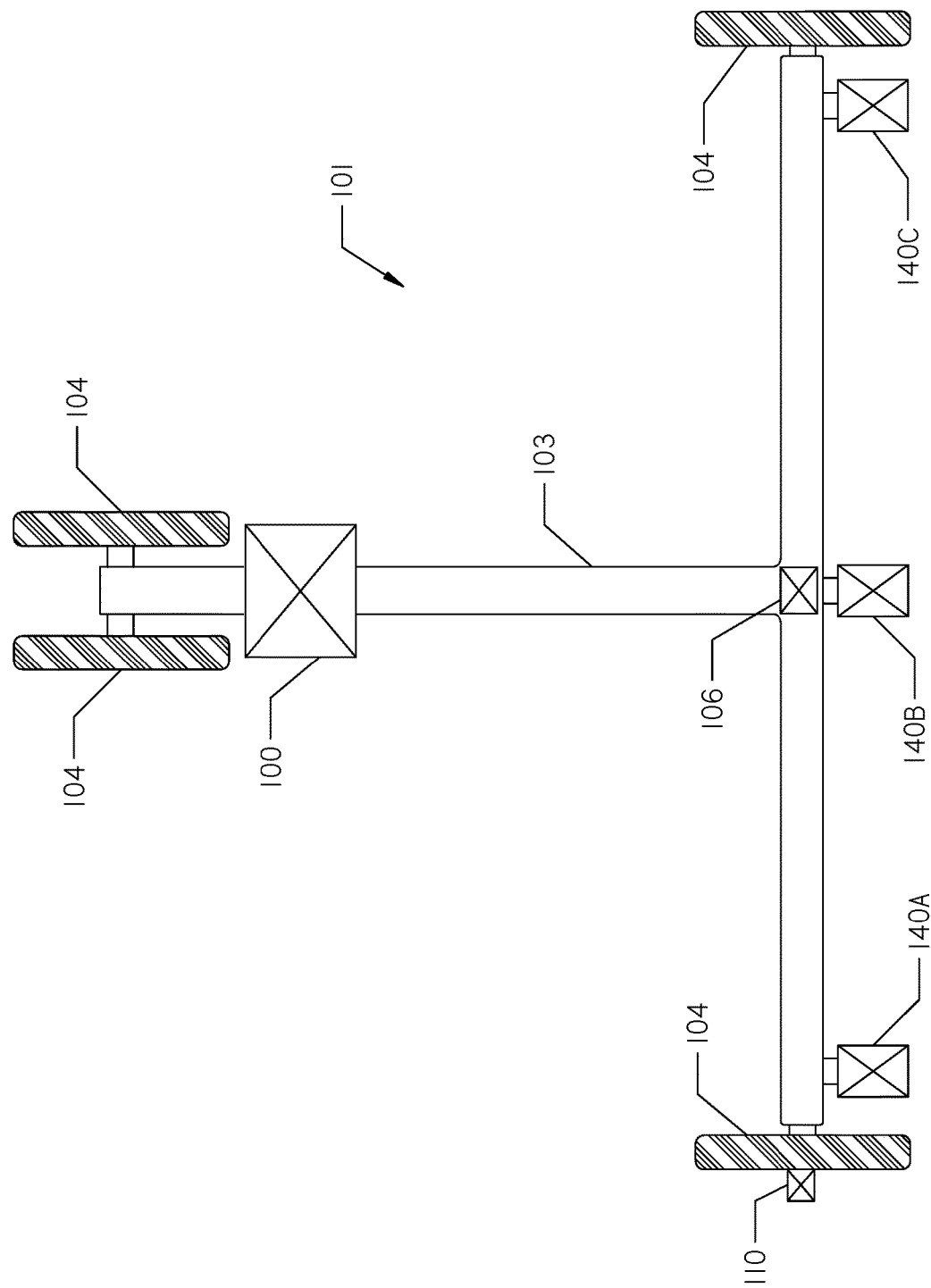
FIG. 10 is left rear top perspective view of a frame-mounted sensor array for use as a separate component for detecting a buried pipeline.
Figure 11:
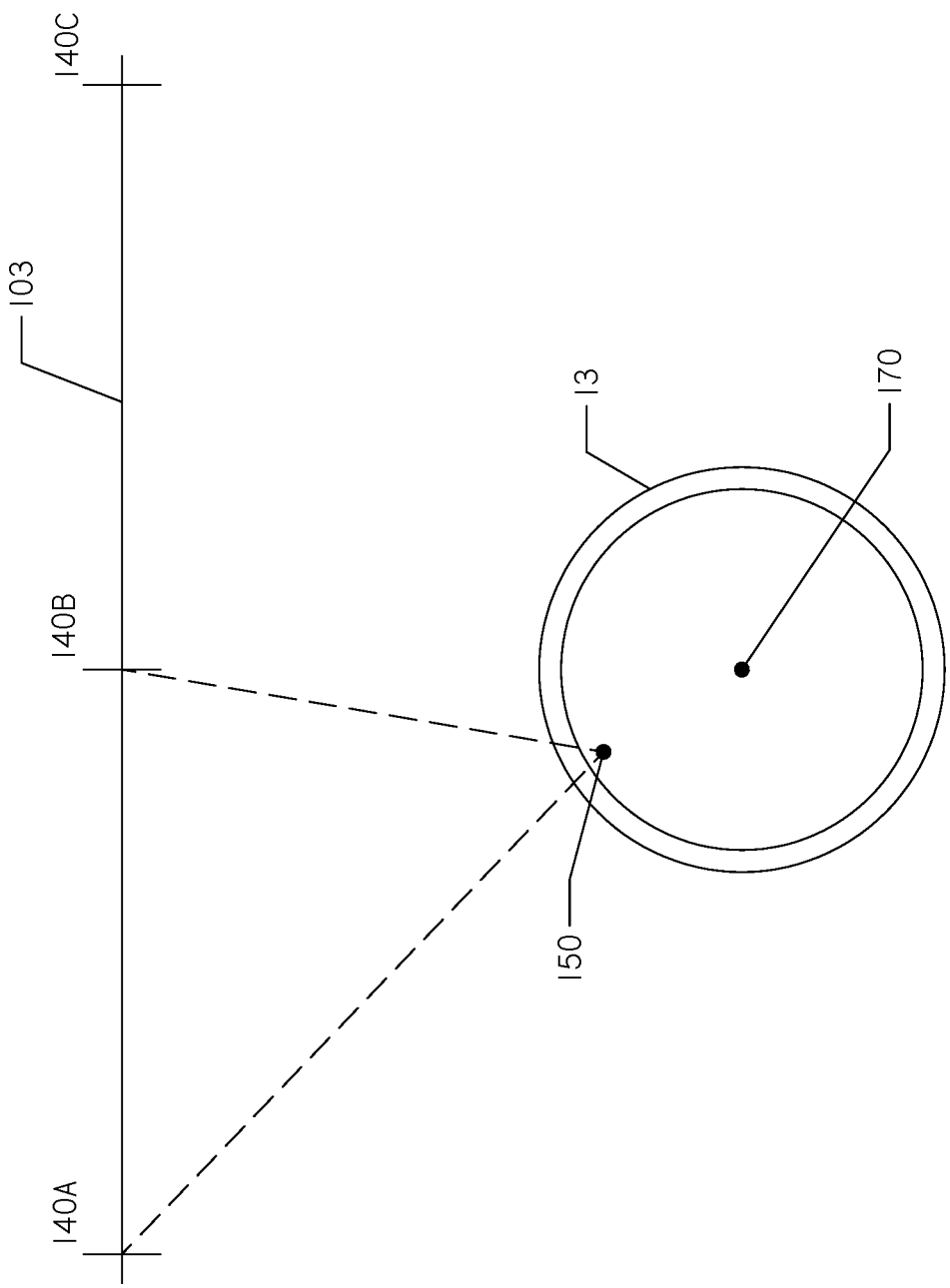
FIG. 11 is a diagrammatic representation of a locate operation wherein point 150 is estimated by sensors 140A and 140B.

With continued reference to FIG. 10, three sensors 140A-C are arranged on a mobile frame 103. The frame 103 is moved across a surface of the ground on motive elements such as wheels 104. The sensors 140A-C, as sensors 40 in FIGS. 1-9, detect a signal emanating from the underground pipeline 13. Alternatively, the frame 103 can be carried by an operator or mounted on a tractor or motorized cart. The three sensors 140 are maintained in a single plane by the frame 103. While three sensors 140, arranged linearly, are shown in FIG. 10, other embodiments could have fewer or more sensors, or could be placed in a single plane but in a non-linear arrangement.

The vehicle 101 further comprises an inclinometer 106. The inclinometer 106 measures the angle of the frame 103 relative to earth level, both left and right, front and rearward. Thus, deviations in the plane of the sensors 140A-C from a level plane can be detected. A wheel position sensor no may be used to detect the changing position of the wheels 104. The wheel position sensor 110 may provide data to determine distance traveled and velocity of the vehicle 101.

Alternatively, or in cooperation with the wheel position sensor 110, a global position sensor, such as a global navigation satellite sensor (GNSS) may be used to detect the absolute global position of the vehicle 100, enabling mapping of the underground pipeline 13.

The vehicle 101 may communicate with a processor 100, located either onboard or off of the frame 103. The sensors 14A-C, inclinometer 106, and wheel position sensor no collect data, which is sent to the processor 100, as in the embodiment of FIGS. 1-9. The processor 100 gathers the outputs of the sensors 140A-C and mathematically compares them to produce an overall measurement of an estimated position of the underground pipeline 13. This position may be absolute, relative to the frame 103, or both.

One advantage to using a separate vehicle 101 rather than an outrigger 42 is that errors, when detected, may be mitigated or investigated without concern for a simultaneous trenching project. Further, the separate vehicle 101 may endeavor to drive directly over a buried pipeline 13, where an outrigger 42 may be limited in its position due to safety factors related to the uncovering of a trench.

When the frame 103 is a part of a moving vehicle, the processor 100 may be affixed to that vehicle. The operator may alternatively be remote. The output of the predicted location of the path of the pipeline 13 may be used to control the steering of the vehicle 101. This control may occur autonomously or semi-autonomously. Alternatively, the output may be displayed to an operator who may make steering corrections, either from the vehicle 101, or a remote location.

Figure 3C:
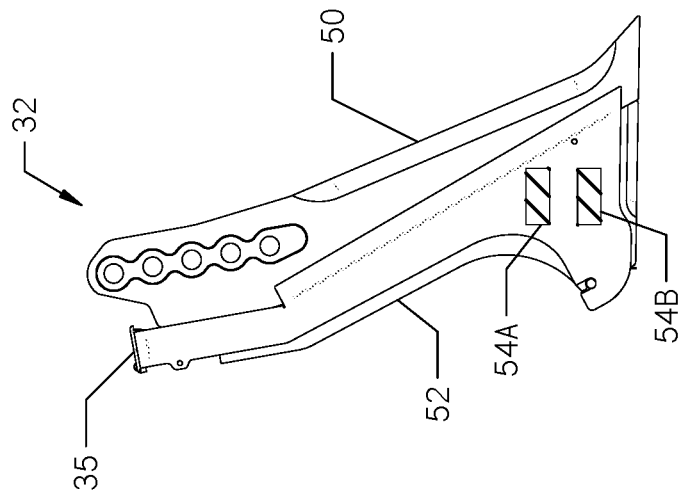
FIG. 3C is a side view of a plow blade having two embedded sensors.
Figure 3B:
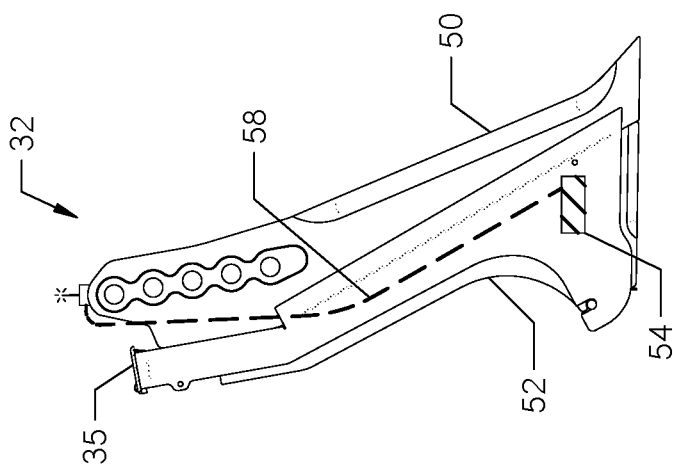
FIG. 3B is a side view of a plow blade having an embedded sensor.
Figure 3A:
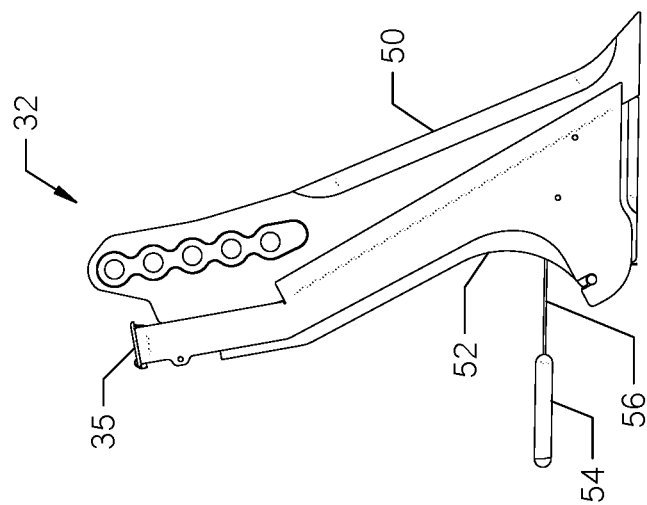
FIG. 3A is a side view of a plow blade having a trailing sensor.
Figure 4:
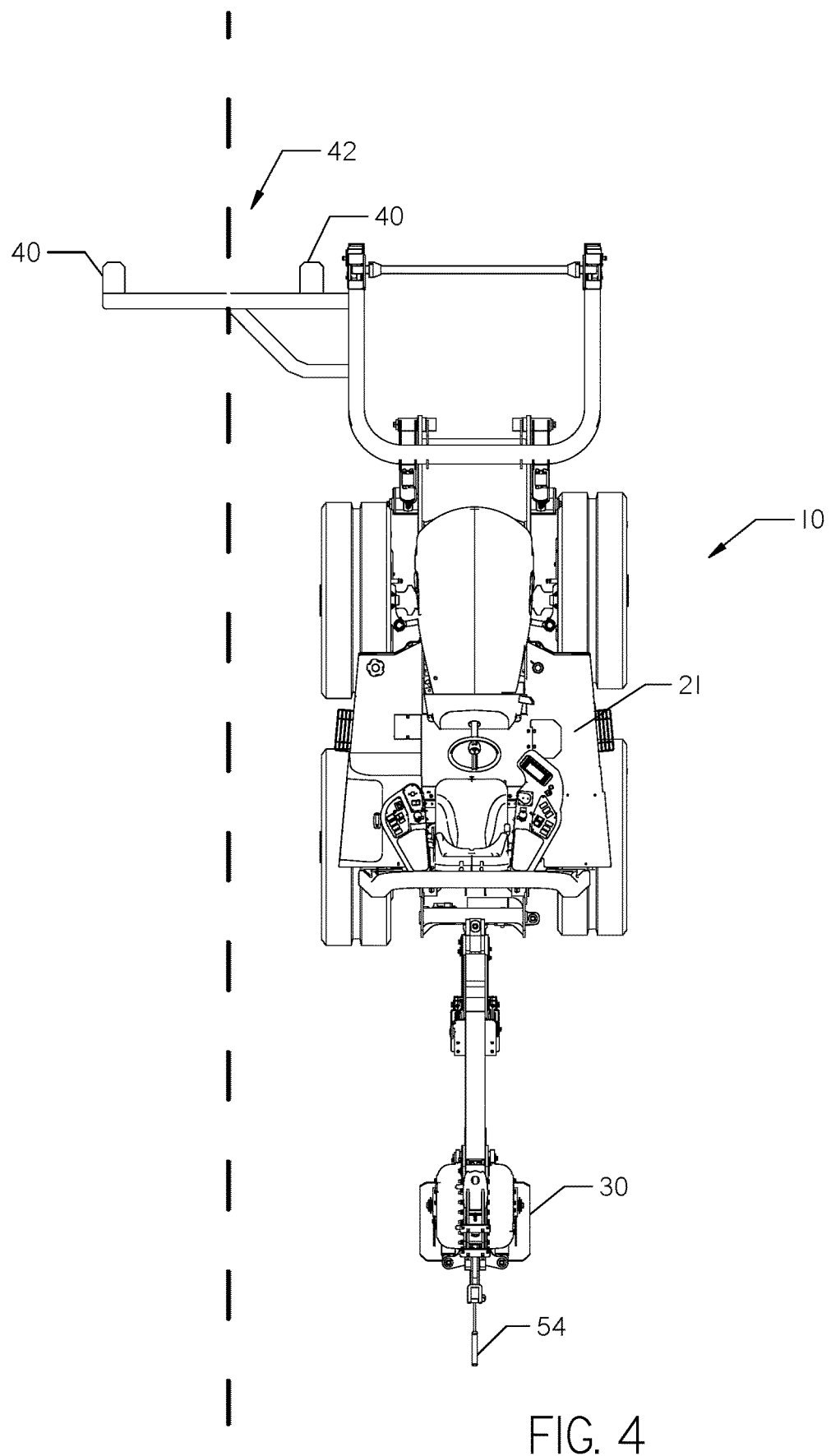
FIG. 4 is an alternative cable installation machine having two sensors on a forwardly-disposed outrigger.

With reference now to FIGS. 3A-3C, the plow blade 32 is shown in detail. The plow blade 32 comprises a blade edge 50, a trailing edge 52 and a proximity sensor 54. The blade edge 50 is the leading edge of the plow blade, and opens the trench. The trailing edge may include the cable guide 35 for installation of the monitoring line 12 within the opened trench.

The proximity sensor 54 may be of the same type as sensors 40, or may be a ferrite rod or other antenna capable of detecting the transmitted steady-state signal emanating from the pipeline. Alternatively, sensor 54 may sense a physical property of pipe 13 such as a magnetic signal. In FIG. 3A, the proximity sensor 54 is attached to the trailing edge 52 by a flexible or semi-rigid rod or cable 56. The cable 56 is capable of transmitting received signals to the processor 100.

FIG. 3B shows a sensor 54 formed within the plow blade 32 itself. As shown, a transmission cable 58 may be disposed within the blade 32. This cable 58 may transmit signals to the processor 100 directly or through a wireless connection. FIG. 3C shows two vertically displaced proximity sensors 54A and 54B. Vertical displacement of a known distance may aid in detection of a distance from the pipeline from the plow blade 32.

A suspended mass generator (not shown) or equivalent power source may be built into the plow blade 32 to provide power for the proximity sensor 54 and any corresponding electronics package in the blade structure.

The proximity sensor 54 is configured to provide an indication of separation from the pipeline. A generally decreasing separation distance, indicated by a strengthening received signal or other indicia, may indicate an approaching pipeline strike. The processor 100 may be configured to provide a minimum gap for the distance 17 (FIG. 2B), subject to error tolerances. This gap may be from 12 to 18 inches or more. The processor 100 detects that the distance between the plow blade is less than the minimum gap. The gap indication may be presented to an operator of the installation machine 10 as a quantified distance. Alternatively, the installation machine 10 may be stopped or automatically steered away from the pipeline by the processor 100.

Communication between the processor 100, steering systems on the machine 10, and the various sensors 40, 54 may be provided by wireless methods, such as Bluetooth. Alternatively, communication may be to a remote operator location some distance away from machine 10.

The plow blade 32 is preferably made of a non-magnetic alloy, such as Mangalloy, Nitronic 50 or Nitronic 60. Other such alloys may likewise be used. Further, pockets for installation of internal sensors such as in FIGS. 3B and 3C may be formed through laminar construction of the plow blade 32. In such cases, the sensors 54 may be positioned in the pocket and sealed in place with a wear resistant material such as polyurethane. Non-metallic plow blades 32 will limit interference with the received transmission at the proximity sensor 54.

The plow assembly 30 may comprise plow shoes, tires, or other devices to manually control the depth. The processor 100 may alternatively control plow depth based upon the detected position of the pipeline. In this configuration, the plow assembly 30 may be adjusted by a control system (not shown). The control system may comprise hydraulic cylinders (not shown) to control the maximum plow depth, and thus the depth of the trench in which the monitoring line 12 is installed. The control system responds to signals generated by the processor 100 to adjust plow depth based upon one or more factors such as pipe depth, blade depth, surface contour of the soil, plow location, position relative to an external laser plane, or others.

The sensors 40 and proximity sensor 54 may be responsive to cathodic protection signals commonly applied to metallic pipelines for reducing corrosion. Such a configuration allows existing pipeline signals to be used to locate the pipeline.

The installation machine 10 may be controlled remotely with the operator maintaining a distance from the footprint 14 of the pipeline. The machine 10 may follow a predetermined path, a paint line, a guide wire, or may be steered automatically due to the detected position of the pipeline.

Figure 6A:
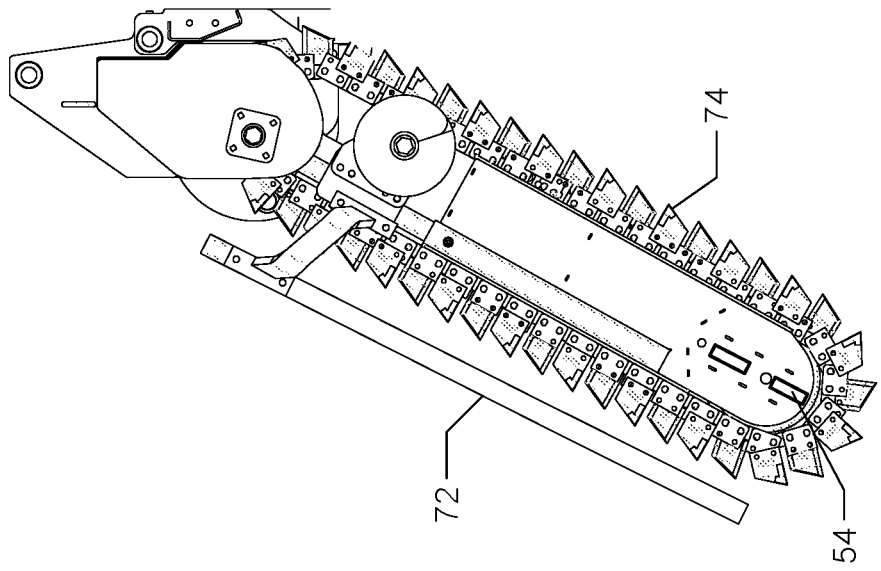
FIG. 6A is a side view of a trencher boom having sensors in a restraint arm.
Figure 6B:
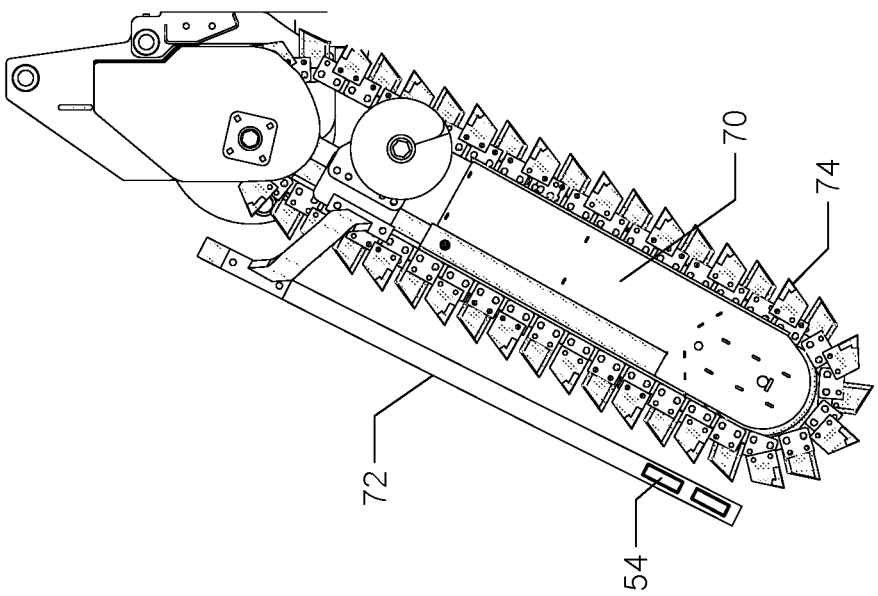
FIG. 6B is a side view of a trencher boom having sensors within the boom.

With reference to FIGS. 6A and 6B, one or more proximity sensors 54 may be placed within a trencher boom 70 rather than a vibratory plow. The proximity sensors 54 may be placed within a restraint bar 72 (FIG. 6A) or the trencher boom 70 itself (FIG. 6B). As with the plow assembly 30, the trencher boom 70, restraint bar 72, and trencher chain 74 may preferably be made of a nonmagnetic material to limit interference with the proximity sensors 54.

Use of a triaxial magnetometer as one or all of the sensors 40, 54 allows one of the three axes of the sensor 40, 54 to be aligned with the longitudinal axis 26. If the sensor 40, 54 is near a filamentary conductor, this axial measurement will be null when the longitudinal axis 26 and the conductor are parallel. However, as the pipeline size increases, its field will not approximate a filament. Therefore, the use of several redundant sensors and measurements described herein will aid in maintaining a parallel installation of the monitoring cable 12 at a desired distance from the pipeline 13.

Figure 7:
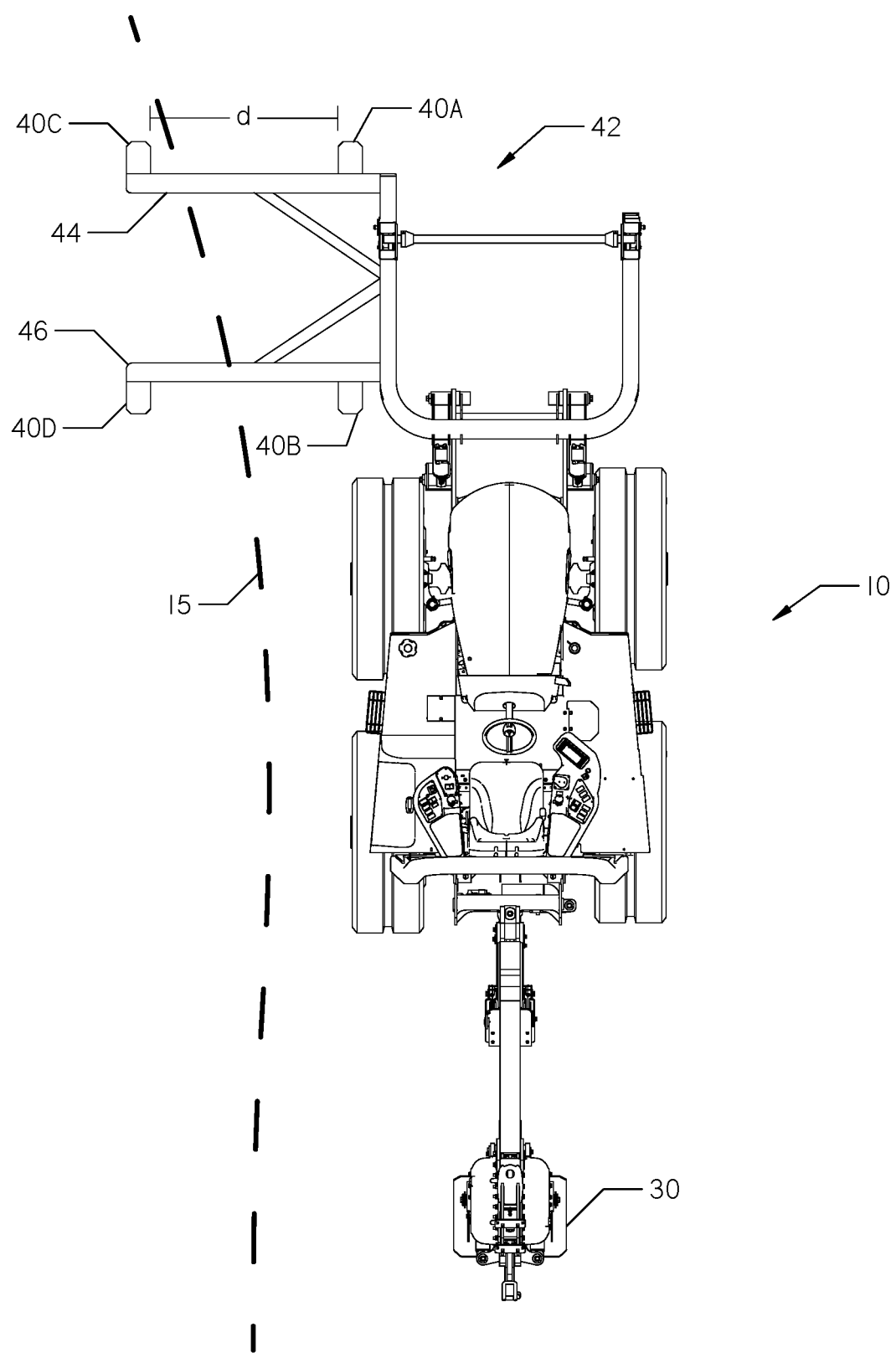
FIG. 7 is the cable installation machine of FIG. 1 disposed above a curving buried pipeline.

With reference to FIG. 7, the installation machine 10 of FIG. 1 is shown with the pipeline 13 turning, necessitating a steering step. The processor 100 detects an electromagnetic field emanating from the pipeline 13 at at least four discrete points, a first and third sensor 40A, 40C disposed on the front arm 44, and a second and fourth sensor 40B, 40D disposed on the rear arm 46.

The sensors 40A-D are disposed a known distance d away from each other on each respective arm 44, 46. Thus, each pair of sensors 40A, 40C and 40B, 40D is optimally a distance d/2 away from a position directly above the centerline 15 of the pipeline.

The processor 100 wishes to maintain the centerline 15 of the pipeline at equal distances from the first sensor 40A and third sensor 40C. However, in FIG. 7 sensor 40C is closer to the centerline 15 than sensor 40A. The departure from optimal is given as an error $\varepsilon$. The error $\varepsilon$ is positive in the direction of 40A and negative in the direction of 40C.

The processor 100 may then determine a steering control response. As the error $\varepsilon$ should be less than d/2. The steering control response can be illustrated by considering the case where two sensors 40A-D are coplanar with a filamentary line. In such a case, the processor's steering response would be given by:

$$\text{Response} = \frac{8\varepsilon}{\left(\frac{d}{2}\right)^2 - 4(\varepsilon)^2}$$

In a practical geometry, the response is complicated by the fact that the pipeline and sensors are not coplanar, and by the possibility that the pipeline has a diameter sufficiently large that it may not be treated as a filament. The general appearance of the steering response will, however, be similar in its general features to the mathematical relationship given above. In particular, a steering control will produce a signal when $\varepsilon=0$.

By detecting the error between sensors 40A-D disposed both at the front arm 44 and rear arm 46, the processor 100 will determine not only that a turn to the left is required, but also the magnitude of the steering correction in degrees based upon the errors in the front and rear sensors 40A-D.

The sensor orientation of FIG. 7, especially if used in conjunction with other sensors, such as a proximity sensor 54 (FIG. 5), may enable other "paired" sensors to create useful readings to aid the processor 100 in determining the position of the pipeline 13 and steering steps.

With reference to FIGS. 11-14, the sensor 140A-C orientation in FIG. 10 on the separate vehicle 101 allows for a method for estimating the pipeline 13 centroid 170 and error. While this method is shown with respect to three sensors 140A-C, similar methods of estimating error may be used for the various embodiments of the invention.

Figure 12:
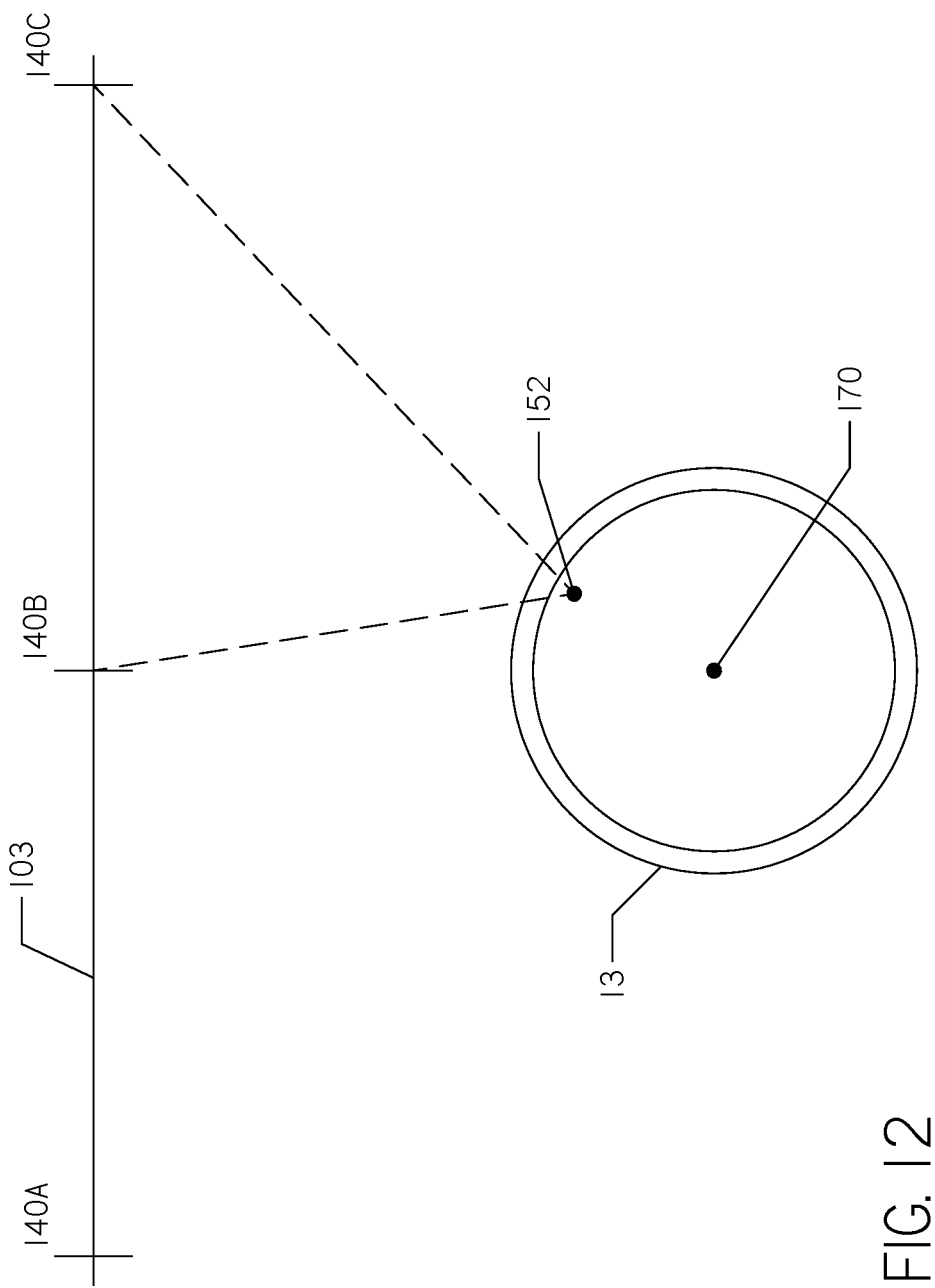
FIG. 12 is a diagrammatic representation of a locate operation wherein point 152 is estimated by sensors 140B and 140C.
Figure 13:
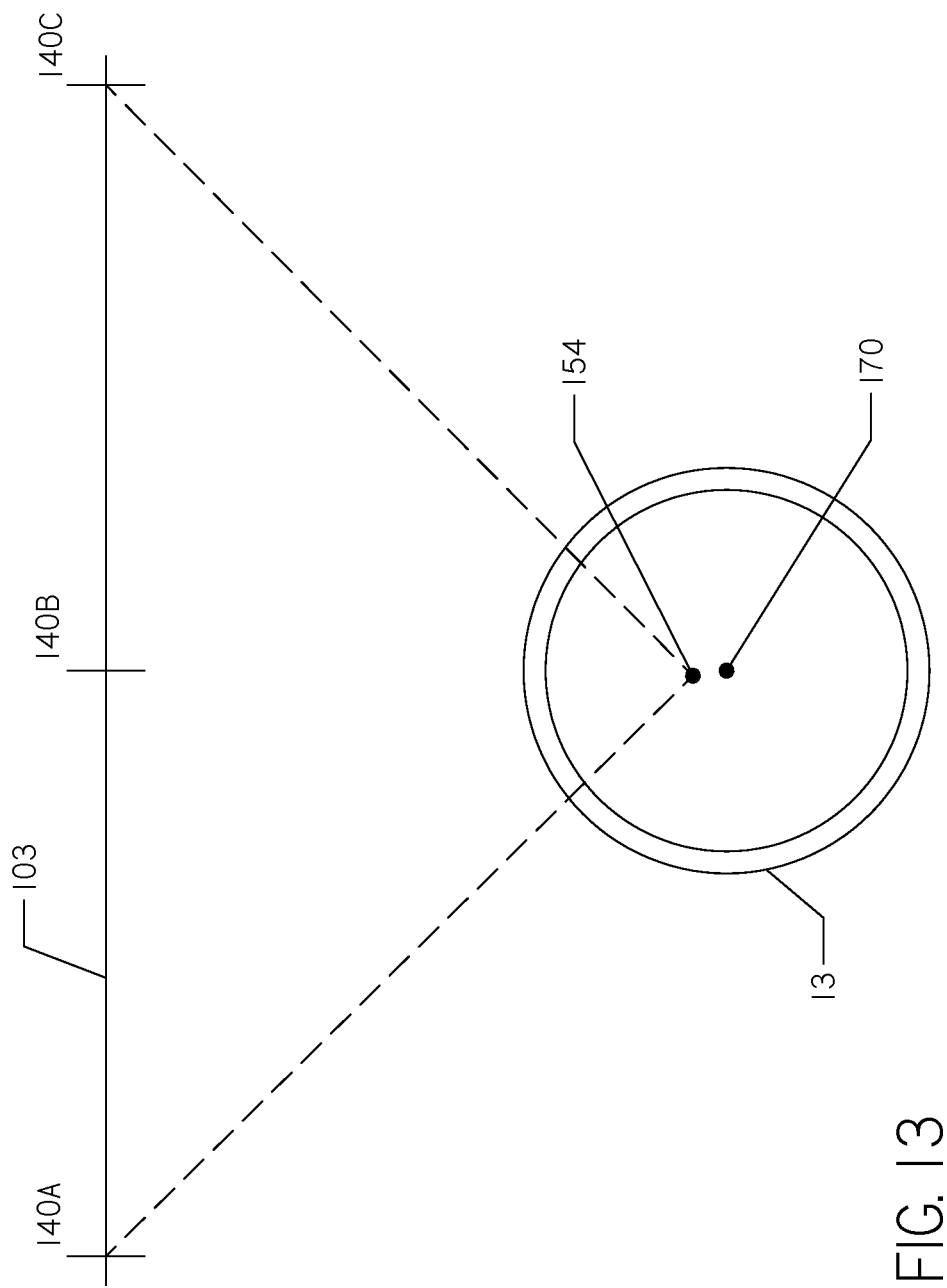
FIG. 13 is a diagrammatic representation of a locate operation wherein point 154 is estimated by sensors 140A and 140C.

Using this arrangement, the system determines three estimated locations 150, 152, 154 for the underground pipe 13 (or the centroid thereof) by triangulating the position of the signal using each pair of the three sensors 140. For example, in FIG. 11, estimated location 150 is detected by sensors 140A, 140B. In FIG. 12, estimated location 152 is detected by sensors 140B, 140C. In FIG. 13, estimated location 154 is detected by sensors 140A, 140C.

Figure 14:
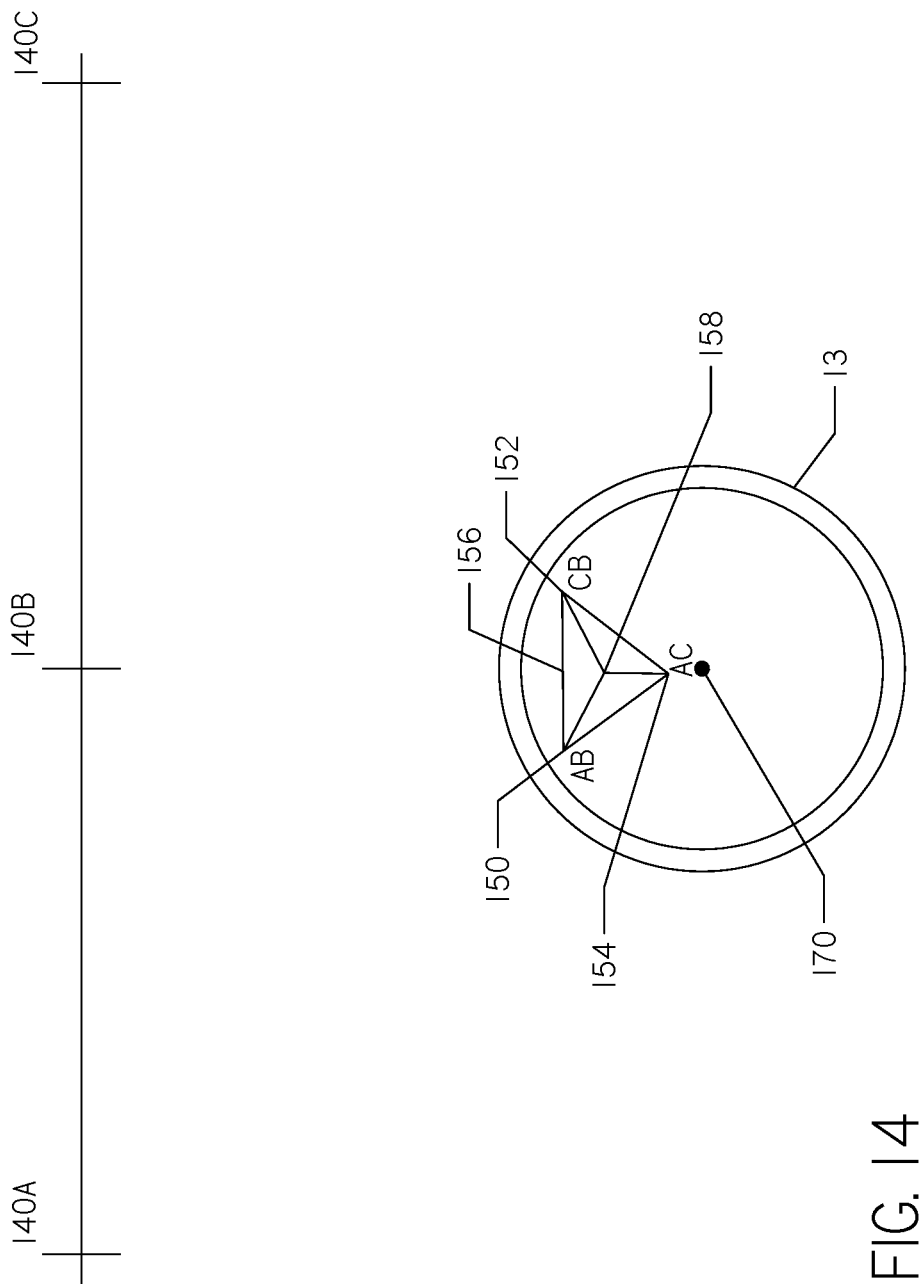
FIG. 14 is a diagrammatic representation of a locate triangle being used to estimate measurement error in a pipeline detection operation. The centroid of the locate triangle is an improved predicted position of the pipe centroid.

With reference to FIG. 14, the three estimated locations 150, 152, 154 are plotted on a triangle 156. The area of the triangle 156 represents the relative error in the locating operation. A centroid 158 of the triangle 156 represents the predicted location of the pipe 13 centroid given the three estimated locations 150, 152, 154.

While triangulation is given as a method for finding the estimated locations, signal strength may alternatively be used to determine an estimated location at each antenna. These points could be plotted and a triangle 156 determined using this method as well. Various methods of calibration would be used to normalize the antennas relative to one another.

It is instructive to see in FIG. 14 that none of the estimated locations 150, 152, 154 are at the centroid 170 of the underground pipe 13. Nor is the predicted location 158 at the centroid. It should be understood that field effects in large pipelines 13 often result in the detected position appearing "closer" to the sensor 140A-C than it is. By using the estimated locations 150, 152, 154 to find an improved estimated location 158, some of these known distortions can be avoided, though an artisan should be aware of potential errors.

The area defined by the triangle 156 from the three separate measurements of located position (150, 152, 154), is an indicator of the magnitude of error of the current location position. As the set of three sensors 140A-C are moved across the pipeline 13, the position and area of the location triangle 156 changes for each position measurement of the pipeline 13. The centroid 158 of the triangle 156 would be used to indicate the best estimate of pipeline 13 centroid location for any position of the frame 103 (FIG. 10). The smallest location triangle 156 area will indicate the most accurate location.

In some cases, the area of the location triangle 156 can be used to indicate an acceptable location determination, or in other words, if the area is too large, then location uncertainty is too great to accept. The detection can thus be halted for a secondary locate operation, such as soft excavation, or the process repeated to see if an acceptable error value can be achieved.

Another advantage of the method of using three antenna sets instead of just one or two, is that if any single locator 140A-C is faulty, it will produce a location triangle 158 that is oddly shaped. The processor 100 can discern by analyzing the results and giving a stop signal in the location operation. Note that this technique might be extended to more than three antennas if higher accuracy or improved reliability is required.

Four potential options for sensors that would sense unintended encroachment of the pipeline 13 are given below. These options may be described as acoustic, capacitive, inductive, and reflected impedance. The term "encroachment" is used to define separation between the pipeline 13 and a plow assembly 30 or other blade.

Accurate distance measurement requires knowledge of pipeline geometry, pipeline material and, usually, material properties of the soil matrix. Soil matrix material properties are rarely known in detail. As a result, techniques for location are qualitative indications of separation rather than reasonably accurate quantitative separation measurements. For example, differential transit time acoustic measurement, described in the following paragraphs, is expected to provide reasonable indication of encroachment, but calculation of separation distance requires knowledge of signal propagation velocity in the soil. Determination of soil velocity is difficult and disturbed soil, often associated with fill placed above and about a pipeline, is typically nonhomogeneous.

Acoustic Sensing

Acoustic approach detection is similar to seismic technology employed in geophysics and the petroleum industry, in ranging applications such as RADAR and SONAR, and in ultrasound studies. The word "acoustic" is used here in the general sense of propagating compression and rarefaction wavefronts in a medium, whether or not it creates sound audible to the human ear.

Acoustic ranging may use a single transducer as both transmitter and receiver, but design complications of the single-transducer approach can be avoided using separate transmitting 200 and receiving 202 elements. This separate-element geometry is well suited to underground applications, where typical plow blade and tool housing geometries allow use of separated transmitter and receiver elements. This, in turn, permits optimization of each element for its particular purpose.

Figure 8:
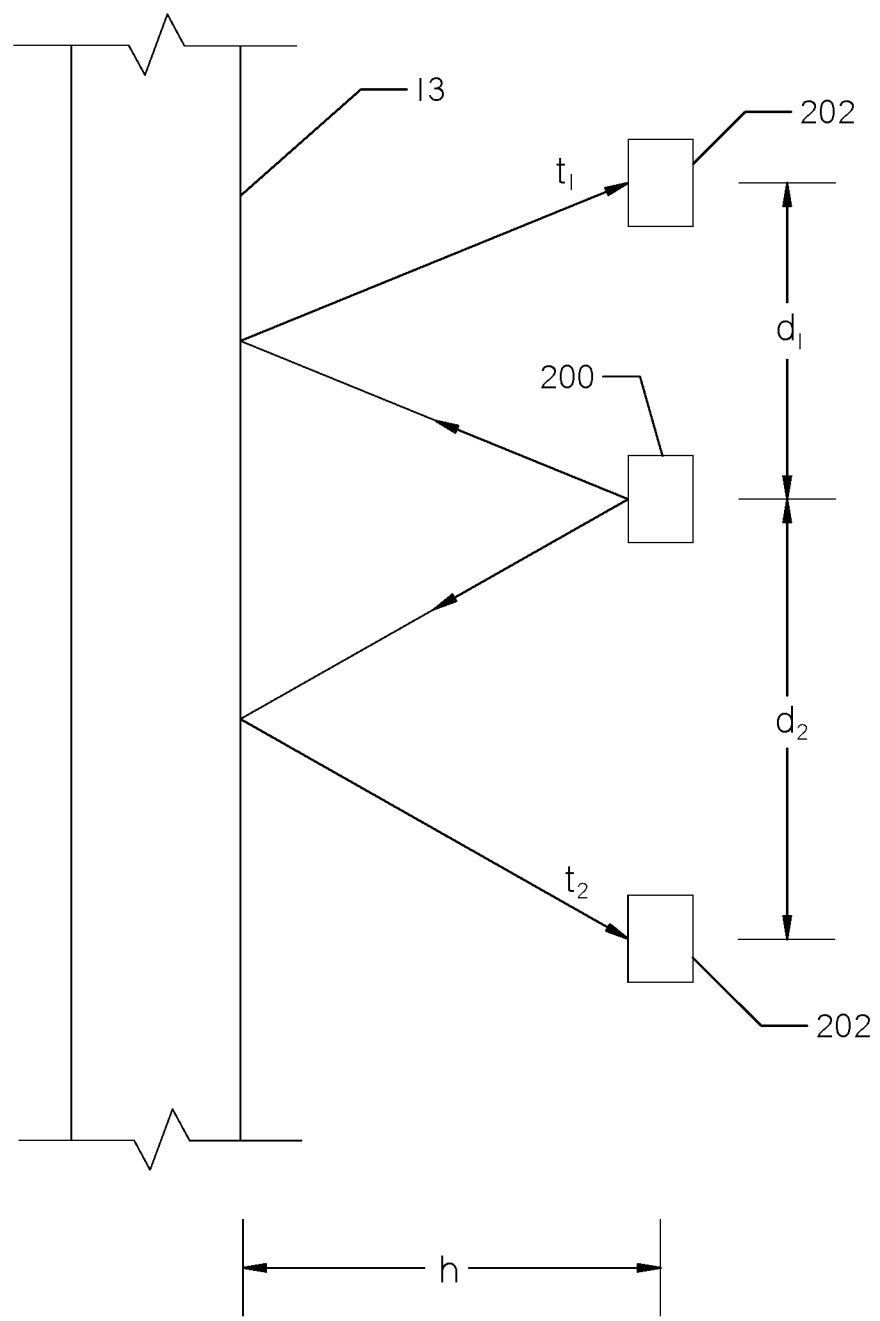
FIG. 8 is a diagram of a pipe and sensor system with a mathematical representation of signal generation and reception to determine a relationship between sensors and an underground pipe.

An acoustic impulse may be coupled to the trench or borehole wall by a variety of methods. An air gap between source and the soil matrix wall may be avoided using a variety of spring-loaded or other mechanically coupled design options. The general geometry of the problem is shown in FIG. 8, which illustrates a single acoustic source 200 and two acoustic receivers 202. A stimulus signal from the source 200 propagates through the medium (soil, in this case) and, if a defined surface is present (e.g., a pipeline 13), a portion of the acoustic energy is reflected and propagates back to the receiving elements 202 on the plow blade 32 or installation machine 10. The transit time between stimulus and reflected signal reception is a function of the path length and the velocity of the medium, as noted in FIG. 8.

Drilling and plowing operations are done in the top surface (vadose zone) of the soil column, where propagation velocities vary tremendously even in intact material. Transit time is sufficient to determine an undesired approach to a pipeline, even if it is not possible to calculate the separation distance with reasonable accuracy (the calculation requires knowledge of the medium's propagation velocity). If a reflection is detected, it is clear evidence a reflecting surface is present. If the reflection transit time decreases as drilling or plowing continues, it is evidence the plow blade 32 or installation machine 10 is approaching the pipeline.

FIG. 8 illustrates an arrangement whereby multiple (in this case, two) sensors 202 are employed, each having a different offset distance from the source element 200. In this arrangement, it is possible to measure a differential transit (or arrival) time, $\Delta t$—the time difference between reflected wavefront arrivals from the same source pulse as measured by sensors having different offsets. We assume the sensor with offset d1 is closest the leading edge of the plow blade 32 or the head of the drilling tool. If separation h is large compared to d1 and d2, the differential arrival time $\Delta t$ is approximately zero. As separation h decreases, the differential arrival time $\Delta t$ begins to increase, as shown in the simulation of FIG. 9. An increased differential arrival suggests the shorter offset d1 relative to the separation distance h is becoming a significant consideration. This, in turn, suggests the blade 32 or bit is very near the pipeline 13. The differential arrival time is monotonic with increasing slope as separation distance decreases.

Assuming that the signal is transmitted at time t=0, the following relationship can be used to calculate the distance h from the pipe (as shown in FIG. 8) using known and sensed values. Velocity of the signal through the medium is the unknown v, but assumed to be uniform.

$$t_1 = \frac{1}{v}\left[2\sqrt{h^2 + \left(\frac{1}{2}d_1\right)^2}\right] = \frac{1}{v}\left[\sqrt{4h^2 + d_1^2}\right]$$

$$t_2 = \frac{1}{v}\left[2\sqrt{h^2 + \left(\frac{1}{2}d_2\right)^2}\right] = \frac{1}{v}\left[\sqrt{4h^2 + d_2^2}\right]$$

With a differential arrival of the signals back at receivers 202 at $\Delta t$:

$$\Delta t = \frac{1}{v}\left[\sqrt{4h^2 + d_2^2} - \sqrt{4h^2 + d_1^2}\right]$$

Velocity is unknown, but if it assumed to be locally uniform along the path of each signal, the differences between the times of signal arrival and the known distances between the source 200 and receivers 202 can be used to determine how distance h is changing:

$$\Delta t \propto \sqrt{4h^2 + d_2^2} - \sqrt{4h^2 + d_1^2}$$

Capacitive Sensing

Most large pipelines 13 are metal. A sensor may use detection technology responsive to the capacitance between an isolated metal plate on the plow blade or drill housing and the pipeline being paralleled. In this approach, the soil matrix is a nonhomogeneous lossy dielectric, which makes the response very difficult to predict analytically. It is anticipated a capacitive response will be a near-field effect useful when capacitance begins to shift as a function of distance traveled. Accurate frequency measurements are readily implemented by electronics suitable for subsurface applications, making use of sensed capacitance to vary, or "pull," the frequency of an oscillator in the plow blade or tool a preferred technology. Isolation of the tool- or blade-mounted capacitor plate may be achieved by embedding a metal plate in an insulating window made of ceramic, polyurethane, or other suitable material.

Eddy-Current Inductive

Metal pipelines 13 with reasonable conductivity are readily located by inductive methods typical of those used by metal detectors and a locating receiver's "broadcast mode." The instrument generates a source electromagnetic field which induces eddy currents in the metal object or pipeline. These eddy currents produce an electromagnetic field which is detectable by suitable receiver electronics. Pipelines 13 comprise a significant mass of metal and have generally linear structures, making metal detection technology a very reasonable technical option to avoid encroachment while paralleling a pipeline.

A source coil is needed to generate the exciting electromagnetic field. In the case of a plow (or trencher) blade, the source may be implemented by a coil embedded in a structural pocket in the plow blade itself. An especially desirable way to form the mounting pocket is by assembling the plow blade from a plurality of nonmagnetic metal sheets (e.g., Nitronic 50, Nitronic 60, Magnalloy, or Monel) bolted or otherwise joined together to form a laminar composite structure. Interior layers may contain voids and channels to create the pocket needed to accommodate a source induction coil and associated electrical wires. Alternatively, the exterior layers may be fabricated with voids or windows immediately adjacent the source induction coil.

These exterior voids or windows will be formed using ceramic plate, polyurethane, or other suitable nonmagnetic, non-conductive material with mechanical properties suitable for use in the underground construction environment. A generally cylindrical tool housing may be fabricated in a similar fashion using non-magnetic alloys and a non-magnetic, non-conductive window.

A pulsed source will induce eddy currents in the pipeline metal. When the source signal is turned off with sufficient rapidity, the eddy currents will decrease over time in a characteristically exponentially-decaying pattern readily detected and processed by a receiving antenna and associated electronics in the plow blade or tool housing. This technique is known in the art as the Transient Electromagnetic (TEM) method, time-domain electromagnetic (TDEM) method, or pulse electromagnetic (PEM) method. There are advantages to using different antennas for the source signal and to detect the received signal, but this is not a design requirement.

Transformer Reflected Impedance

Electrical power transformer designers are familiar with reflected impedance, a phenomenon describing the effect a load (or load change) on one transformer winding produces on the other winding(s). A simple single-primary, single-secondary transformer may be used. The source excitation signal is applied to the primary, and the secondary circuit's load impedance is called simply the load. While the impedance of either winding can be reflected to the other winding, this discussion concerns the secondary winding's reflected load effect on the primary winding. We remind the reader transformers are AC devices.

The load on the secondary winding is a complex impedance. The impedance has a resistive portion and a reactive portion. The reactive portion of the load may be either capacitive or inductive and, in the case of power transformers, the effect of load impedance is associated with a measurement called the power factor, a measure related to the cosine of the phase relationship between the transformer's primary voltage and primary current. Load impedance variations produce corresponding changes in the phase relationship between voltage and current in the transformer primary.

Whereas power engineers often wish to minimize reflected impedance effects and reduce power losses in the transformer, this embodiment deliberately emphasizes or enhances the transformer's sensitivity to reflected impedance (whether capacitive or inductive) to detect the approach of the installation machine 10 to a pipeline 13. The sensing device(s) on the transformer's secondary may be either a coil, a conductive plate, or both. Because the reflected impedance technique will work with either inductive or capacitive load variations, it is amenable to whichever effect (inductive or capacitive) is dominant. The transformer's secondary may also have a resistive load component to manipulate the transformer's secondary load impedance for greatest sensitivity to the reactive reflected signal component in the primary winding. The actual measurement itself will be the phase difference between the primary voltage and primary current waveforms.

Changes may be made in the construction, operation and arrangement of the various parts, elements, steps and procedures described herein without departing from the spirit and scope of the invention as described herein and in the claims.

The invention claimed is:

1. A system comprising:
a mobile machine frame;
an outrigger frame attached to the mobile machine frame;
a first receiver, a second receiver, and a third receiver, each of the first, second and third receivers disposed linearly on the outrigger frame at a known distance from each of the other of the first, second and third receivers, in which the receivers are each configured to detect a signal emanating from an underground utility line;
an orientation sensor disposed on the outrigger frame and configured to transmit an orientation signal indicative of an angle of the outrigger frame relative to level plane; and
a processor configured to determine a position of the underground line using the signal received at each of the first, second and third receivers and the orientation signal.

2. The system of claim 1 in which the processor is configured to determine a path of travel for the mobile machine frame using the position of the underground utility line.

3. The system of claim 1 further comprising a memory, in which the processor is configured to store the position of the underground utility line in the memory.

4. The system of claim 3 further comprising:
a plow blade configured to open a trench proximate the position of the underground utility line; and
a length of cable.

5. The system of claim 4 in which the plow blade is disposed on the mobile machine frame.

6. The system of claim 1 in which the processor is configured to:
determine a detected source location of each of the signals;
compare the detected source locations by plotting a polygon; and
determine a predicted location and an estimated error in the predicted location of the underground utility line using an area of the polygon.

7. A method comprising:
placing an electromagnetic signal on an underground line;
translating a mobile frame comprising an attached outrigger frame on the ground such that the outrigger frame is overlying a length of the underground line;
while the mobile frame is translating on the ground, detecting the signal, simultaneously, at three locations on the outrigger frame, wherein the three locations are disposed along a line;
while the mobile frame is translating on the ground, detecting, with an orientation sensor, the angle of the line on which the three locations are disposed relative to a level plane as the mobile frame translates on the ground;
using each of the detected signals along with the detected level and location, determining an estimated position of the underground line;
from the estimated position, determining a predicted location of the underground line and an estimated error value in the predicted location.

8. The method of claim 7 further comprising:
causing the mobile frame to travel on a path upon which a strength of the electromagnetic signal does not fall below a predetermined level.

9. The method of claim 7 further comprising:
comparing the estimated error value to a predetermined threshold; and
stopping the translation of the mobile frame when the error value exceeds the predetermined threshold.

10. The method of claim 7 further comprising:
determining, from the predicted location of the underground line, a preferred path for a monitoring line; and
installing the monitoring line along the preferred path.

11. The method of claim 10 in which the step of installing the monitoring line comprises opening a trench with a plow blade.

12. The method of claim 11 wherein the plow blade is disposed on the mobile frame.

13. The method of claim 7 in which the underground line comprises a high pressure gas pipeline having a known diameter.

14. The method of claim 7, in which the step of determining an estimated error value comprises:
plotting each of the estimated locations of the underground line; and
determining an area defined by a polygon having vertices at each of the estimated locations.

15. The method of claim 14 further comprising ceasing translation of the mobile frame if the area exceeds a predetermined threshold.

* * * * *

UNITED STATES PATENT AND TRADEMARK OFFICE
CERTIFICATE OF CORRECTION

PATENT NO. : 12,259,094 B2
APPLICATION NO. : 17/112049
DATED : March 25, 2025
INVENTOR(S) : Brian K. Bailey et al.

Page 1 of 1

It is certified that error appears in the above-identified patent and that said Letters Patent is hereby corrected as shown below:

In the Specification

Column 6, Line 30, please delete "no" and substitute therefor "110".
Column 6, Line 41, please delete "14A-C" and substitute therefor "140A-C".
Column 6, Line 41, please delete "no" and substitute therefor "110".

Signed and Sealed this
Twenty-second Day of April, 2025

Coke Morgan Stewart
*Acting Director of the United States Patent and Trademark Office*